(12) United States Patent
Hannweber et al.

(10) Patent No.: US 9,588,338 B2
(45) Date of Patent: Mar. 7, 2017

(54) REFLECTIVE OPTICAL ELEMENT FOR A DYNAMIC DEFLECTION OF A LASER BEAM AND METHOD FOR MANUFACTURE THEREOF

(71) Applicant: Fraunhofer-Gesellschaft zur Foerderung der Angewandten Forschung E.V., Munich (DE)

(72) Inventors: Jan Hannweber, Dresden (DE); Steffen Bonss, Zella-Mehlis (DE); Stefan Braun, Dresden (DE); Georg Dietrich, Leipzig (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/808,975

(22) PCT Filed: Jan. 20, 2014

(86) PCT No.: PCT/EP2014/051025
§ 371 (c)(1),
(2) Date: Jul. 24, 2015

(87) PCT Pub. No.: WO2014/144591
PCT Pub. Date: Jul. 31, 2014

(65) Prior Publication Data
US 2016/0011413 A1    Jan. 14, 2016

(30) Foreign Application Priority Data
Jan. 24, 2013 (DE) .................. 10 2013 001 417

(51) Int. Cl.
*G02B 26/08* (2006.01)
*G02B 26/10* (2006.01)
*G02B 7/182* (2006.01)
*G02B 5/08* (2006.01)
*B23K 1/00* (2006.01)
*B23K 1/005* (2006.01)
*B23K 1/20* (2006.01)

(52) U.S. Cl.
CPC .......... *G02B 26/105* (2013.01); *B23K 1/0004* (2013.01); *B23K 1/0008* (2013.01); *B23K 1/0056* (2013.01); *B23K 1/206* (2013.01); *G02B 5/08* (2013.01); *G02B 5/0808* (2013.01); *G02B 7/1821* (2013.01)

(58) Field of Classification Search
CPC ...... G02B 5/09; G02B 5/0833; G02B 5/0858; G02B 7/182; G02B 5/08; G02B 26/10; G02B 5/10; G02B 7/1827; G02B 5/0891

USPC .......................................... 359/198.1–225.1
See application file for complete search history.

(56) References Cited

U.S. PATENT DOCUMENTS

| 5,946,125 | A | * | 8/1999 | Ang | ................. | G02B 5/0833 |
|---|---|---|---|---|---|---|
| | | | | | | 359/216.1 |
| 2004/0223721 | A1 | | 11/2004 | Flanders | | |
| 2005/0082343 | A1 | | 4/2005 | Wang | | |
| 2005/0111122 | A1 | | 5/2005 | Pruyn | | |
| 2009/0062024 | A1 | | 3/2009 | DeBoalt | | |
| 2010/0029502 | A1 | | 2/2010 | Matysiak | | |

FOREIGN PATENT DOCUMENTS

| DE | 10205425 | A1 | 5/2003 |
|---|---|---|---|
| DE | 10204249 | A1 | 8/2003 |
| DE | 102011080819 | A1 | 9/2012 |
| DE | 102012202047 | A1 | 1/2013 |
| WO | WO 01/79548 | A2 | 10/2001 |
| WO | WO 2008/036802 | A2 | 3/2003 |
| WO | WO 03/059929 | A1 | 7/2003 |

OTHER PUBLICATIONS

Hauser et al., "Utilising the left-helical confirmation of L-DNA for analysing different marker types . . . ", Nucleic Acids Research, vol. 34, No. 18, Oct. 1, 2006, pp. 5101-5111.
Wang et al., "Microarrays assembled in microfluidic chips fabricated from poly (methyl methacrylate) . . . ", Amer. Chem. Soc., vol. 75, No. 5, Mar. 1, 2003, pp. 1130-1140.
Brandstetter et al., "A polymer-based DNA biochip platform for human papilloma virus genotyping", J. Virological Methods, vol. 163, No. 1, Jan. 1, 2010, pp. 40-48.
Abramov et al., "HNA and ANA high-affinity arrays for detections of DNA and RNA single-base mismatches", Biosensors & Bioelectronics, vol. 23, No. 11, Jun. 15, 2008, pp. 1728-1732.
Yew et al., "DNA-directed assembly of protein microarrays", Frontiers in Bioscience, vol. 13, May 1, 2008, pp. 5755-5771.

* cited by examiner

*Primary Examiner* — Euncha Cherry
(74) *Attorney, Agent, or Firm* — Jacobson Holman, PLLC.

(57) ABSTRACT

The invention relates to reflective optical elements for a dynamic deflection of a laser beam and to a manufacturing method for these reflective elements. It is the object of the invention to provide reflective optical elements for a dynamic deflection of laser beams which can be manufactured less expensively and which are flexible in their geometrical design so that they achieve improved properties in dynamic operation. In the reflective optical element in accordance with the invention, a surface of a base body and a plate-shaped reflective element are connected to one another in a planar manner and with material continuity by means of a solder connection.

13 Claims, No Drawings

REFLECTIVE OPTICAL ELEMENT FOR A DYNAMIC DEFLECTION OF A LASER BEAM AND METHOD FOR MANUFACTURE THEREOF

FIELD AND BACKGROUND OF THE INVENTION

The invention relates to reflective optical elements for a dynamic deflection of a laser beam and to a manufacturing method for these reflective elements. Such reflective elements are typically also called scanner mirrors which can be pivoted about at least one axis by means of a drive. A laser beam incident onto the reflective surface is reflected in dependence on the angle of incidence and can be correspondingly deflected by the pivoting and in so doing, for example, the focus of the laser beam can be deflected one-dimensionally or two-dimensionally for a processing. It is obvious in this respect that high accelerations act on a scanner mirror on the pivoting since high deflection speeds of the laser beam are desired. A reduced deadweight of the moved part of such a reflective element with a correspondingly small mass moment of inertia is therefore an important parameter to be observed.

Further demands on these elements which reflect laser radiation are high degrees of reflectance (reflectivity) for the radiation, good heat conduction and sufficient thermal resistance, mechanical strength and stiffness, which should be observed for as long-lasting a time as possible.

Scanner mirrors have to date been manufactured using aluminum, beryllium, silicon or silicon carbide. The volumes to be produced are limited and large batch sizes do not occur in this respect. Metallic base bodies are typically used which have a surface which reflects the laser radiation. The base bodies have different geometrical designs due to the above-named required properties. Cooling fins are present, for example, to allow a cooling to a tolerable temperature. The manufacture of such base bodies normally does not produce any larger problems. However, since a high reflectance is required at the reflective surface, an extremely complex and/or expensive surface machining has to be carried out at the reflective surface which has previously only been achievable by a chipping machining. An example for such a machining is glaze milling. However, this mechanical processing substantially determines the level of the manufacturing costs. A further disadvantage moreover occurs through this machining. It is namely not possible to produce such a single-part reflective element using the known technical means. For this reason, at least always two parts, namely a reflective part which is already well polished or which can be easily polished and a holder for receiving a drive shaft, have to be connected to one another. An adhesive connection is usually selected for this whose thermal resistance and service life are problematic, however. The observation of high precision is additionally required in this joining step since the two parts have to be adjusted very precisely with respect to one another.

Such a two-part design can also not be geometrically designed in an optimized form since there are construction and technical joining restrictions.

SUMMARY OF THE INVENTION

It is therefore the object of the invention to provide reflective optical elements for a dynamic deflection of laser beams which can be manufactured less expensively and which are flexible in their geometrical design so that they achieve improved properties in dynamic operation.

This object is achieved in accordance with the invention by the features of the claims herein.

In the reflective optical element in accordance with the invention, a surface of a base body and a plate-shaped reflective element are connected to one another in a planar manner and with material continuity by means of a solder connection.

The plate-shaped reflective element can in this respect be formed from silicon, an optical glass, sapphire, Zerodur or a glass-ceramic having a very low coefficient of thermal expansion (ULE). The plate-shaped reflective element can preferably be composed of a part which has been cut from a silicon wafer and whose size corresponds to the desired reflective surface. Silicon has a good thermal conductivity so that an effective cooling can be reached.

The base body can be manufactured from the most varied substances or materials. It can be a metal or a ceramic material. There is also the possibility of using composite materials or fiber-reinforced materials. The manufacture can take place using various known manufacturing methods. It can also be carried out using a rapid prototyping process. Demanding design shapes can be formed which can be optimized for the respective use, in particular with respect to mechanical, dynamic and thermal demands.

The possibility of a single-part design of the base body is particularly advantageous in this respect in which, for example, one or more holders for the drive are already integrated. Cooling elements such as cooling fins can be formed at the base body or cooling channels can be formed in the base body.

The surface of the plate-shaped reflective element which reflects a laser beam can be provided with a layer or a coating which reflects the laser radiation. It can, for example, be an interference layer system adapted to a specific wavelength of the laser radiation to be reflected or a reflective metal layer. There is, however, also the possibility of providing this surface solely or additionally with an oxidation protection layer and/or a scratch protection layer for this purpose. Diamond-like carbon (DLC), silicon oxide, aluminum oxide or other dielectric layers can be used as the material for this purpose, for example.

The respective surface of the base body and/or the surface of the plate-shaped reflective element to be joined with this surface can favorably be provided with a wetting layer with which an improved wetting behavior of the solder used can be achieved. Gold, copper, tin, silver or nickel or an alloy thereof can thus be used for a wetting layer, for example, with a plate-shaped reflective element composed of silicon.

A cleaning of the surface can also be carried out before the forming of a wetting layer or before the actual joining with material continuity by means of solder for a good layer adhesion or solder adhesion. This is also the case when, as will be described in more detail in the following, a solder layer having reactive nanometer multilayers formed thereover is to be applied to a surface to be joined. The cleaning can take place by ion bombardment or by a plasma treatment under vacuum conditions.

Wetting layers, but also other layers, can preferably be formed using PVD processes known per se, preferably by magnetron sputtering. Predefined layer thickness can thus be achieved with an acceptable deposition rate and very high surface qualities can be achieved. The latter is in particular important for the reflection for the optical properties.

A plate-shaped reflective element which can be used in the invention should have a thickness smaller than 1 mm, preferably smaller than 500 µm, and particularly preferably smaller than 100 µm. This in particular has the advantage that it has a small deadweight and is elastically deformable within limits so that surface flaws on joining and later mechanical strains by different coefficients of thermal expansion between the base body and the plate-shaped reflective element can be reduced. Very thin plate-shaped elements can also be adapted to an arched surface having a larger radius while joining, whereby the manufacture of reflective surfaces arched concavely or convexly on a correspondingly arched surface of a base body becomes possible.

A procedure is followed in the manufacture such that reactive nanometer multilayers and at least one solder layer are formed or arranged between the respective surface of the base body and the surface of the plate-shaped reflective element. The base body and the plate-shaped element are then pressed together by an application of compressive force with the reactive nanometer multilayers arranged or present between them and the at least one solder layer. A pressure is preferably observed in this respect between 0.5 MPa and 15 MPa.

The reactive nanometer multilayers are then activated by an energy input which can preferably be achieved by an electric ignition or by a laser beam so that the solder is melted and the connection of the base body to the plate-shaped reflective element with material continuity after the solidifying of the solder is established by the released heat. The heat released by the exothermic reaction acts very briefly so that it results in a locally limited temperature increase which is sufficient for melting the solder, but does not cause any negative thermal impairment at the base body or at the plate-shaped reflective element.

There is the possibility in this respect of providing a reactive nanometer multilayer system with a respective solder layer at its two surfaces or with a solder layer at only one side and to arrange it in this form between the respective surface of the base body and of the plate-shaped reflective element before they are pressed together.

However, a solder layer and a reactive nanometer multilayer system can also be formed directly on the respective surface to be joined of the base body and/or of the plate-shaped reflective element.

A reactive nanometer multilayer system and optionally also a solder layer can be manufactured by a PVD process, preferably by magnetron sputtering. A reactive nanometer multilayer system can be formed in a manner known per se from alternatingly arranged layers of two metals which react exothermically with one another on an interdiffusion. In this respect, Ni/Al, Ti/Al, Ti/Si, Zr/Al or Zr/Si layers having individual layer thicknesses in the range between 5 nm and 50 nm can, for example, form a reactive nanometer multilayer system. The released energy and the temperature usable for melting the solder as well as the speed at which the exothermic reaction propagates over the surface of the reactive nanometer multilayer system can be influenced by the number and/or the respectively selected layer thickness of the individual layers. In this respect, the respective layer thickness of the layers formed from the individual metals also determines the proportion of the respective metal which can react exothermically on the interdiffusion.

The total thickness of a reactive nanometer multilayer system can be in the range between 5 µm and 15 µm. The reactive nanometer multilayer system used should be selected such that the melting temperature of the solder used is exceeded, but at least reached, in the exothermic reaction.

A solder layer can, however, also be applied to at least one of the two surfaces to be joined of the base body or of the plate-shaped reflective element by a different coating process. This can be achieved galvanically, for example.

An already mentioned wetting layer can be formed on at least one of the surfaces to be joined together of the base body and/or of the plate-shaped reflective element before the joining. A wetting layer can in this respect preferably be formed from Au, Cu or Ni.

A reactive nanometer multilayer system should be used whose surface area is larger than the surface area of the plate-shaped reflective element so that an exposed surface region is present for the energy input for activating the reactive nanometer multilayers. As already addressed, a laser beam can be directed onto this exposed surface region and a sufficient energy input for igniting the exothermic reaction can be achieved using said laser beam. This can, however, also be achieved by applying an electric voltage and a spark formation in this surface region.

A solder can be used which is selected from pure tin, pure indium, a silver-tin alloy, a gold-tin alloy, a silver-copper-tin alloy, an indium-copper-silver alloy and an aluminum-silicon compound. The layer thickness of a solder layer should be in the range from 5 µm to 15 µm.

The permanently permitted temperature which occurs during operation and which should be below the melting temperature of the solder can be taken into account on the selection of the solder. This temperature is determined by the laser power, the incident beam cross-section and the operation of the laser. The temperature with a laser operated in cw mode is thus larger than in pulsed operation. It has, however, been found that laser powers of several kW and a continuously operated laser can be mastered without problems.

Care should be taken that the surfaces to be joined to one another have a sufficient surface quality before the joining of the base body and the plate-shaped reflective element.

A base body which can be used in the invention can advantageously be manufactured using a rapid prototyping process in which a free, three-dimensional shape can be formed and in which undercuts and hollow spaces can particularly advantageously be formed. Under the aspect of lightweight construction, filigree structures and very small wall thicknesses in the range around 0.5 mm should thus be able to be formed.

Suitable processes in this respect are selective laser sintering in which a powdery material of the material forming the base body is applied in a layer-wise manner and each layer is acted on by a two-dimensionally movable or deflectable laser beam. The materials can be sintered to one another at the irradiated positions. The powdery material can later be removed from the non-irradiated regions so that a three-dimensional base body in which hollow spaces can also be present can be manufactured using this method.

Printing processes can also be used for the manufacture of base bodies in which a suspension containing the respective base body material in powder form is applied layer-by-layer such that the desired geometrical design can be manufactured three-dimensionally. A drying should in this respect take place after the application of every single layer. A completely manufactured green body can then be fully sintered in a thermal treatment.

The printing can take place by screen printing or using a two-dimensionally or three-dimensionally movable printhead which can have a similar design to ink-jet printing.

DETAILED DESCRIPTION OF EMBODIMENT OF THE INVENTION

The invention will be described in the following with reference to a specific embodiment.

The base body in this respect comprises aluminum and is brought into the desired geometrical shape either by a directly shaping process, e.g. molding, or by a chipping machining. All the required elements for a cooling and holding are in this respect formed directly at the base body.

The surface of the base body to be joined to a plate-shaped element is cleaned using an organic solvent.

A section of a silicon wafer having a thickness of 520 µm was selected for the plate-shaped reflective element. It had a surface area of 10*10 mm². A circular plate-shaped reflective element can, however, also be used which has an area of approximately the same size.

The surface of the plate-shaped reflective element to be joined to the base body was provided with a wetting layer of nickel having a layer thickness of 500 nm. A solder layer of an Sn/Ag alloy having a melting temperature of 220° C. was applied to this wetting layer.

A reactive nanometer multilayer system which had been coated with a solder layer of the same solder at the surface facing in the direction of the base body was inserted between the surface to be joined of the base body and of the plate-shaped reflective element. The two solder layers had a layer thickness of 7 µm. The reactive nanometer layer system was formed by alternatingly arranged metal layers of nickel and aluminum and had a total thickness of 55 µm. The individual layers had thicknesses of 20 nm to 30 nm.

The base body and the plate-shaped reflective element were pressed together at a pressure of 10 MPa with the reactive nanometer multilayer system arranged therebetween.

The exothermic reaction was subsequently ignited in an exposed surface region of the reactive nanometer multilayer system by an electric sparking initiated therein, whereupon a heating occurred which led to the melting of the solder. The solder was able to spread uniformly over the joining surface and a solid, well-adhering connection with material continuity was achieved between the base body and the plate-shaped reflecting element after the falling below of the melting temperature.

The plate-shaped reflective element was coated at its surface utilized for reflecting the laser beam with an additional reflective, closed silver layer having a layer thickness of at least 500 nm, which was achieved using a PVD process.

What is claimed is:

1. A method of manufacturing a reflective optical element, for a dynamic deflection of a laser beam, said reflective optical element including a base body and a plate-shaped reflective element, characterized in that reactive nanometer layers and at least one solder layer are formed or arranged between a respective surface of the base body and a respective surface of the base body and a surface of the plate-shaped reflective element;
   in that the base body and the plate-shaped reflective element are pressed together by a pressure application with the reactive nanometer multilayers arranged or present therebetween, with a pressure in the range of 0.5 MPa to 15 MPa being observed; and
   in that the reactive nanometer multilayers are activated by an energy input which will be achieved by an electric ignition or by a laser beam so that the solder is melted and the connection of the base body to the plate-shaped reflective element with material continuity after the solidifying of the solder is established by the released heat.

2. A method in accordance with claim 1, characterized in that a wetting layer is formed on at least one of the surfaces to be joined to one another of the base body and/or of the plate-shaped reflective element before the joining.

3. A method in accordance with claim 1, characterized in that reactive nanometer multilayers are used whose surface area is larger than the surface area of the plate-shaped reflective element so that an exposed surface region is present for the energy input for activating the reactive nanometer multilayers.

4. A method in accordance with claim 1, characterized in a solder is used which is selected from pure tin, pure indium, a silver-tin alloy, a gold-tin alloy, a silver-copper-tin alloy, an indium-copper silver alloy and an aluminum-silicon compound.

5. A method in accordance with claim 1, characterized in that the joining surface of the plate-shaped reflective element is cleaned before the joining, with the cleaning taking place by means of direct ion bombardment or using a plasma in a vacuum.

6. A method in accordance with claim 1, characterized in the base body is manufactured using a rapid prototyping process, including a printing process with a subsequent thermal treatment.

7. A method in accordance with claim 2, characterized in that the wetting layer is formed from Au, Cu, Sn, Ag, Ni or an alloy of these elements.

8. A reflective optical element for a dynamic deflection of a laser beam, manufactured by a method according to claim 1, wherein a surface of the base body and the plate-shaped reflective element are connected with material continuity and in a planar manner by means of a solder connection and the plate-shaped reflective element has a thickness smaller than 1 mm.

9. The reflective optical element in accordance with claim 8, characterized in that the plate-shaped reflective element is formed from silicon, an optical glass, sapphire, ULE or Zerodur.

10. The reflective optical element in accordance with claim 8, characterized in that one or more of the respective surfaces of the base body and the plate-shaped reflective element to be joined are provided with a wetting layer.

11. The reflective optical element in accordance with claim 8, characterized in that a mount for a holder of a drive for pivoting the element is formed directly at the base body and the base body is thereby formed in one part.

12. The reflective optical element in accordance with claim 8, characterized in that the plate-shaped reflective element has a thickness smaller than 500 µm.

13. The reflective optical element in accordance with claim 12, characterized in that the plate-shaped reflective element has a thickness smaller than 100 µm.

* * * * *